United States Patent [19]
Akamatsu et al.

[11] Patent Number: 5,771,933
[45] Date of Patent: Jun. 30, 1998

[54] THREE-POSITION SOLENOID VALVE

[75] Inventors: Osamu Akamatsu, Akashi; Kazunori Morimoto, Kobe, both of Japan

[73] Assignee: Nabco Ltd., Kobe, Japan

[21] Appl. No.: 800,142

[22] Filed: Feb. 13, 1997

[30] Foreign Application Priority Data

Feb. 15, 1996 [JP] Japan .................................. 8-053866

[51] Int. Cl.[6] .................................................. F15B 13/044
[52] U.S. Cl. .................................. 137/627.5; 137/596.17
[58] Field of Search ........................... 137/596.17, 627.5; 303/119.2

[56] References Cited

U.S. PATENT DOCUMENTS

3,605,813  9/1971  Nakano et al. ..................... 137/627.5
4,773,447  9/1988  Imanaka et al. .................... 137/627.5
5,445,189  8/1995  Yamamuro ......................... 137/625.65

Primary Examiner—Gerald A. Michalsky
Attorney, Agent, or Firm—James Ray & Associates

[57] ABSTRACT

A three-position solenoid valve that can be used as a normally open type that can prevent reduction of responsivity due to the working pressure acting on a guide cylinder. When the solenoid is demagnetized, it is made to adopt a connecting position and since the working pressure does not act on the guide cylinder that guides the sliding of the moving iron core of the solenoid in this connecting position, it is possible to prevent deformation of the guide cylinder by the working pressure, which would reduce the responsivity of the solenoid valve and reduce the longevity of the solenoid by having the working pressure acting on it for long periods. Thus, it is possible to provide a valve that is suitable for use as a normally open three-position solenoid valve.

7 Claims, 7 Drawing Sheets

THREE-POSITION SOLENOID VALVE

FIELD OF THE INVENTION

The present invention relates, in general, to solenoid valves and, more particularly, this invention is related to a three-position solenoid valve which may be used in a pneumatic brake device for a railroad car.

BACKGROUND OF THE INVENTION

Figure 1:
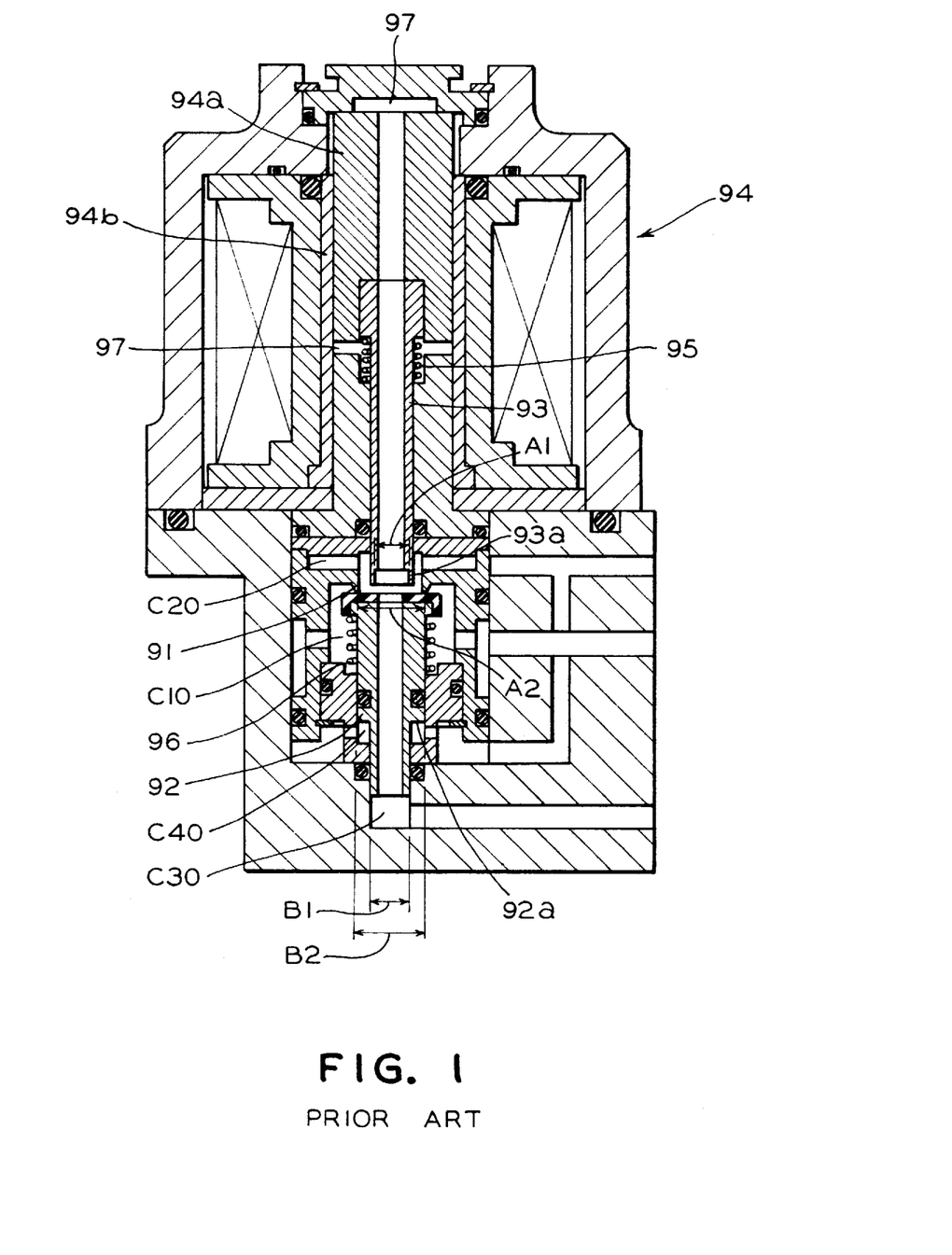
FIG. 1 is a cross-sectional view of a conventional three-position solenoid valve in the prior art.

A three-position solenoid valve is disclosed in "Examined Japanese Utility Model Publication" (JP-B-U) No. S 2-49426 (1927). As seen in FIG. 1, the three-position solenoid valve disclosed in this publication comprises a fixed valve seat 91 provided between a first chamber C10 and a second chamber C20. There is a hollow moving valve 92 that can come into contact with and move away from this fixed valve seat 91. Additionally, hollow push rod 93 includes a moving valve seat 93a whose tip can be fed through the abovementioned fixed valve seat 91 and which applies pressure to the abovementioned moving valve 92 by moving in concert with the moving iron core 94a of solenoid 94. A first spring 95 presses this push rod 93 in the direction along which it separates from moving valve 92, and a second spring 96 presses the abovementioned moving valve 92 in the direction along which it interlocks with fixed valve seat 91. The bottom end part of the abovementioned moving valve 92 is slotted into a third chamber C30 with freedom to slide while remaining airtight.

While solenoid 94 is demagnetized in a three-position solenoid valve with the abovementioned configuration, push rod 93 is pushed up by the pressing force of the abovementioned first spring 95, thereby separating moving valve seat 93a from moving valve 92, and moving valve 92 can be interlocked with fixed valve seat 91 by pushing it up with the pressing force of second spring 96. Thus, while the abovementioned solenoid 94 is demagnetized, it can adopt a connecting position (or exhaust position) wherein second chamber C20 connects with third chamber C30, and first chamber C10 is blocked off.

Also, when the abovementioned solenoid 94 is driven with a current such that the electromagnetic attraction force is at least as large as the pressing force of first spring 95 but less than the combined pressing force of first spring 95 and second spring 96, push rod 93 is pushed down by the electromagnetic attraction force of the solenoid 94, against the pressing force of the abovementioned first spring 95. The moving valve seat 93a thereof can be interlocked with moving valve 92, whereby a blocking position can be adopted in which first chamber C10, second chamber C20 and third chamber C30 are all blocked off.

Furthermore, for example, in the abovementioned demagnetized state, if solenoid 94 is driven with a current such that the electromagnetic attraction force is at least as large as the combined pressing force of the pressing force of first spring 95 and second spring 96, push rod 93 is pushed down against the pressing force of the abovementioned first spring 95 by the electromagnetic attraction force of the said solenoid 94, causing its moving valve seat 93a to interlock with moving valve 92, and it is possible to separate the said moving valve 92 from fixed valve seat 91 by further pushing down push rod 93 along with moving valve 92, against the combined pressing force of the abovementioned first spring 95 and second spring 96, while maintaining this interlocked state. As a result, it can adopt an exhaust position (or connecting position) wherein first chamber C10 and second chamber C20 are connected together and third chamber C30 is blocked off.

Also, in the abovementioned three-position solenoid valve, a balancing chamber C40 which connects with second chamber C20 is formed at a position mid-way between the abovementioned first chamber C10 and third chamber C30, from where it faces into step part 92a of moving valve 92, the effective cross-sectional area A1 of the tip of the abovementioned moving valve seat 93a is made roughly equal to the cross-sectional area B1 of the opening of third chamber C30, and the effective cross-sectional area A2 of fixed valve seat 91 is made roughly equal to the cross-sectional area B2 of the opening of the abovementioned balancing chamber C40, whereby the air pressure acting from above and the air pressure acting from below on moving valve 92 are roughly balanced, and by forming surrounding chambers 97 above and below the moving iron core 94a of solenoid 94 and connecting these surrounding chambers 97 together through the hollow parts of push rod 93 and moving iron core 94a, the air pressure acting from above and the air pressure acting from below on moving iron core 94a are balanced, thereby preventing unstable control operations arising from imbalance in the air pressures acting on the abovementioned moving valve 92 and moving iron core 94a, whereby the electromagnetic attraction force fluctuates sufficiently to move the moving valve 92 and moving iron core 94a.

Since a conventional three-position solenoid valve has the abovementioned configuration and has three positions—connecting, blocking and exhaust—it can be used as a slip prevention valve in a railroad carriage brake device as disclosed in the abovementioned publication of the prior art.

However, from the viewpoint of fail-safe operation, a railroad carriage brake device must have a function whereby the hydropneumatic source and the brake cylinder side are connected together in the event of an accident, and the abovementioned function must also be satisfied when this three-position solenoid valve is incorporated into a railroad carriage brake device.

Thus, when a conventional three-position solenoid valve is connected in series between the hydropneumatic source [control valve (CV)] and the brake cylinder, this three-position solenoid valve must be incorporated in a form where it adopts the connecting position in the demagnetized state (referred to as "normally-open" hereinbelow), and when the conventional three-position solenoid valve is used connected in parallel between the hydropneumatic source and the brake cylinder, this three-position solenoid valve must be incorporated in a form where it adopts the exhaust position in the demagnetized state (referred to as "normally-closed" hereinbelow).

However, when the abovementioned three-position solenoid valve is used as a normally-open type, it is in a state where the working pressure acts on guide cylinder 94b, which guides the movement of moving iron core 94a of solenoid 94, and there has consequently been a problem in that guide cylinder 94b is deformed by this working pressure, increasing the sliding resistance of moving iron core 94a and reducing its responsivity.

To prevent this, the wall thickness of guide cylinder 94b must be made capable of withstanding the working pressure, but in this case the coil diameter of solenoid 94 must be increased by the same amount as the increase in the wall thickness of guide cylinder 94b to obtain the same electromagnetic attraction force with the same driving current as the conventional article, and as a result the coil becomes longer and the resistance of the coil increases.

On the other hand, from the viewpoint of compactness and light weight, railroad carriage brake devices use a scheme wherein the conventional control valve (CV) is dispensed with, and a control valve function is added to the three-position solenoid valve used as a slip control valve. Since a conventional control valve (CV) outputs a brake pressure by supplying and discharging hydropneumatic pressure from a hydropneumatic source based on a command value (pressure), it can be replaced with a three-position solenoid valve having three positions: connecting, blocking, and exhaust. When this control valve (CV) is replaced with a three-position solenoid valve, it is connected in series between the hydropneumatic source and the brake cylinder, and the three-position solenoid valve is used as a normally-open type.

If a configuration is used wherein a three-position solenoid valve is used instead of a control valve (CV) in this way, it must be kept in the exhaust position with the solenoid in a conducting state in order to exhaust the brake pressure inside the brake cylinder when the brake device is not being used (during normal running). Since this conducting state is held for a long time compared with the amount of time for which the brake device is used, a load acts on the solenoid during this period.

Thus in the abovementioned mode of use, since the conventional three-position solenoid valve is used as a normally-open type, there has been a problem in that if the wall thickness of guide cylinder 94b is increased, the coil resistance increases and the load on solenoid 94 is thereby increased accordingly, so that as a result the longevity of solenoid 94 is substantially impaired compared with the case where it is used as a normally-closed type.

The present invention provides a three-position solenoid valve that can be used as a normally-open type without subjecting the guide cylinder to the working pressure.

SUMMARY OF THE INVENTION

According to a first aspect, the present invention provides a three-position solenoid valve wherein a first chamber that connects with the primary side, a second chamber that connects with the secondary side, and a third chamber that connects with the exhaust side are formed inside a casing. The valve can adopt a connecting position wherein the first chamber and second chamber are connected with each other while the third chamber is blocked off; a blocking position wherein the chambers are all blocked off; and an exhaust position wherein the first chamber is blocked off and the second chamber and third chamber are connected with each other. Such three position solenoid valve is characterized in that it comprises a fixed valve seat situated between the first chamber and second chamber. There is a moving valve which is situated inside the first chamber with freedom to slide while remaining airtight, and which interlocks with the fixed valve seat. The solenoid valve also has a push rod which is joined at one end to the moving iron core of the solenoid, and has at its other end a linking aperture that is made to perforate the moving valve through to the second chamber, and connects one end with the other end. The valve also has a hollow moving element which is joined to this push rod and is slotted between the second chamber and third chamber with freedom to slide while remaining airtight. A moving valve seat is provided at the push rod end of this moving element opposite the moving valve, and which can be fed through the inside of the fixed valve seat. A connecting part, is also provided which is formed in the push rod or moving element, and which, in the exhaust position, connects the second chamber with the third chamber through the interior of the moving element. The valve has a first spring which presses the moving valve toward the fixed valve seat and the moving valve seat and a second spring which presses the moving element and push rod in the opposite direction to the pressing force of the first spring with a pressing force that is greater than the pressing force of the first spring.

OBJECTS OF THE INVENTION

It is, therefore, one of the primary objects of the present invention to provide a three-position solenoid valve that can be used as a normally open type without subjecting the guide cylinder to the working pressure.

It is also an object of the present invention to provide a three position solenoid valve wherein the diameters of the airtight sliding part, the effective valve seat of the moving valve, the airtight sliding parts of the moving element and the effective valve seat of the fixed valve are all roughly similar.

In addition to the objects and advantages of the present invention which have been described in detail above, various other objects and advantages will become readily apparent to those persons skilled in solenoid valves from the following more detailed description of such invention particularly when such description is taken in conjunction with the attached drawing Figures and with the appended claims.

BRIEF DESCRIPTION OF THE PRESENTLY PREFERRED AND VARIOUS ALTERNATIVE EMBODIMENTS OF THE INVENTION

Prior to proceeding to the more detailed description of the various embodiments of the invention, it should be noted that, for both the sake of clarity and understanding of the three position solenoid valve according to the present invention, identical components which have identical functions have been identified with identical reference numerals throughout the several views which have been illustrated in the attached drawing Figures.

An embodiment of this invention is described in detail below with reference to the supplementary figures.

Figure 2:
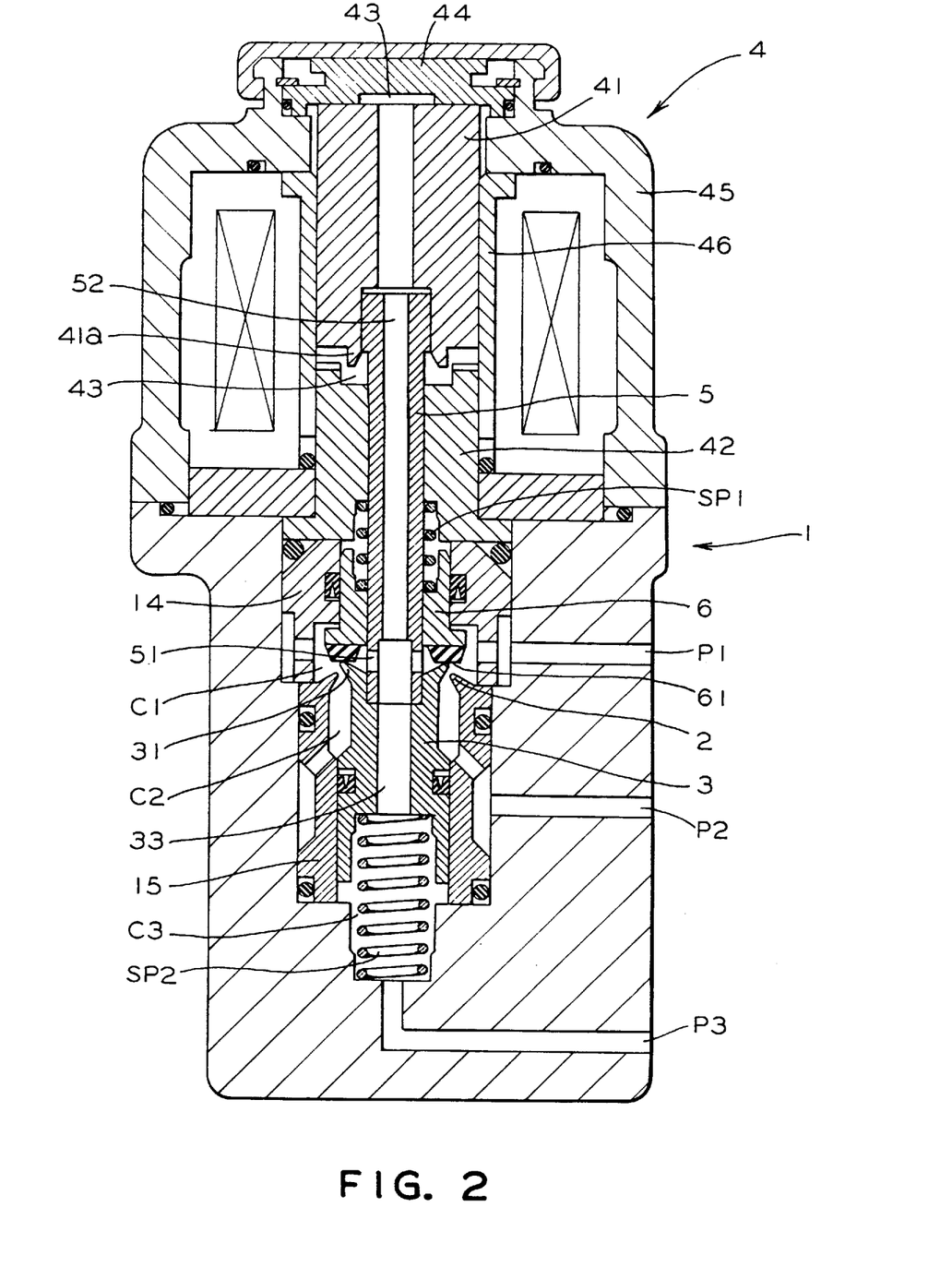
FIG. 2 is a cross-sectional view of one embodiment of a three-position solenoid valve according to the first aspect of the present invention.
Figure 3:
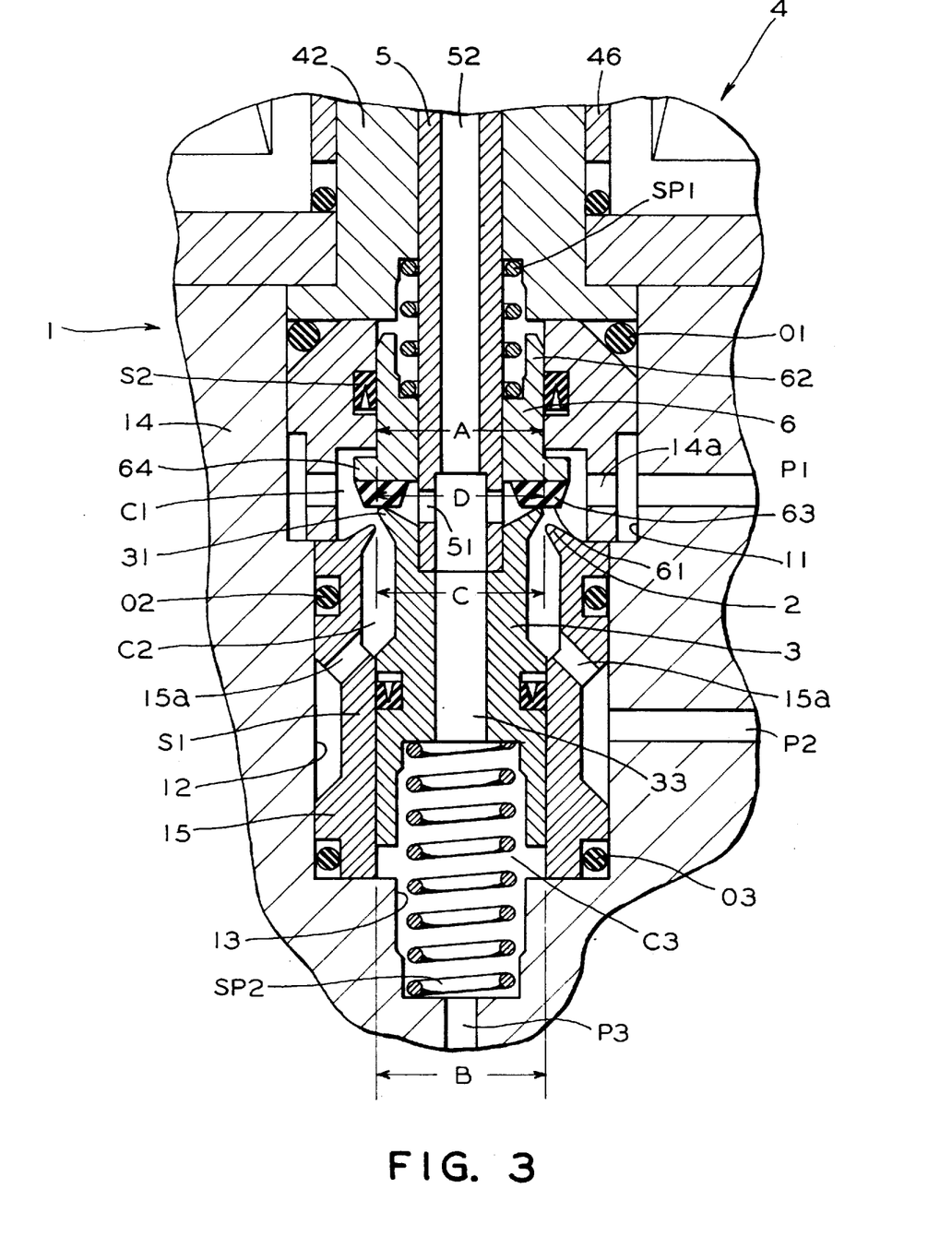
FIG. 3 is an enlarged cross-sectional view of the three-position solenoid valve according to the first aspect of the invention showing the state in which the connecting position is adopted.

FIG. 2 is a cross-sectional view of one embodiment of a three-position solenoid valve according to this invention, and FIG. 3 is an enlarged cross-sectional view of the salient parts thereof. The main parts of this three-position solenoid valve consist of a casing 1 wherein a first chamber C1 connecting with a first port P1, a second chamber C2 connecting with a second port P2, and a third chamber C3 connecting with a third port P3 are sequentially formed. A fixed valve seat 2 is situated between first chamber C1 and second chamber C2. A hollow moving element 3 with a moving valve seat 31 is formed integrally at its top end part. A solenoid 4 and push rod 5 apply pressure to and move this moving element 3. A moving valve 6 is provided in first chamber C1 such that its interlocking surface 61 faces opposite fixed valve seat 2 and moving valve seat 31. A first spring SP1 presses this moving valve 6 in the direction of fixed valve seat 2 and moving valve seat 31, and a second spring SP2 presses moving element 3 and push rod 5 in the opposite direction to the pressing force of first spring SP1. Note that first port P1 is connected with the primary side (the hydropneumatic source side), second port P2 is connected with the secondary side (the actuator side), and third port P3 is connected with the exhaust side (the atmosphere side).

First aperture 11, second aperture 12 and third aperture 13, which have mutually different inner diameters, are formed concentrically from top to bottom in that order in the interior of casing 1. First chamber C1 is configured by the inner cavity part of an annular first intermediate body 14 that is slotted into first aperture 11, and first chamber C1 is connected with first port P1 through a plurality of perforation holes 14a formed in the surrounding wall of first intermediate body 14.

Also, second chamber C2 is configured between moving element 3 and the upper part of the inner cavity part of a hollow second intermediate body 15 which is slotted into second hole 12, and second chamber C2 is connected with second port P2 via a plurality of perforation holes 15a formed in the surrounding wall of second intermediate body 15. Furthermore, third chamber C3 is configured by third aperture 13 and the lower part of the inner cavity part of second intermediate body 15.

Note that a seal is made between first aperture 11 and first intermediate body 14 by a first seal 01 comprising an O-ring interspersed between the two, and a seal is made between second aperture 12 and second intermediate body 15 by a second seal 02 and third seal 03 comprising O-rings interspersed between the two.

Fixed valve seat 2 is integrally formed with the top end part of second intermediate body 15. This fixed valve seat 2 has a tapered shape with gradually decreasing diameter toward the top end, and its top end side projects toward the center.

Moving element 3 has a cylindrical shape with a reduced external diameter at the top part, and its hollow part 33 is formed with a stepped shape with a larger diameter on the lower side. The lower part of the outer periphery of this moving element 3 is slotted with freedom to slide along the inner periphery of second intermediate body 15 between second chamber C2 and third chamber C3 while being kept airtight by first shaft seal S1, and as it moves downward it is able to move moving valve seat 31 away from its interlocked state with the interlocking surface 61 of moving valve 6, through the inside of fixed valve seat 2, and into second chamber C2. Also, moving valve seat 31 is shaped like a petal whose top diameter gradually increases toward the top end, and its top end side projects toward fixed valve seat 2.

Solenoid 4 is attached to the top surface of the above-mentioned casing 1 concentrically with chambers C1, C2 and C3. The top end part of push rod 5 is slotted into the lower part of the inner periphery of moving iron core 41 of this solenoid 4, and the middle part of push rod 5 is fed with freedom to slide through the inner periphery of fixed iron core 42 of solenoid 4. Also, the bottom end surface of fixed iron core 42 is brought into contact with the top surface of first intermediate body 14, and a seal is made between the two by first seal 01.

Moving iron core 41 has its sliding guided by a guide cylinder 46, and an annular projection 41a with a tapered shape is formed at the inner periphery side of its lower end part. This annular projection 41a suppresses sudden changes in the electromagnetic attraction force of solenoid 4 due to the displacement of moving iron core 41, and causes the amount of displacement of moving iron core 41 to be proportional to the amount of displacement of the electromagnetic attraction force.

Furthermore, surrounding chambers 43 are formed above and below moving iron core 41 to balance the hydropneumatic pressures acting on moving iron core 41. Note that the upper surrounding chamber 43 is closed off by a stopper 44 attached to cover 45.

Push rod 5 has a linking aperture 52 in its interior that connects the top end part with the bottom end part, the bottom end part thereof being fed with freedom to slide through the interior of moving valve 6 and slotted into the top part of the inner periphery of moving element 3 in this state. Also, a connecting aperture 51 is formed in the vicinity of the bottom end part of push rod 5 as a connecting part for connecting its inner periphery with its outer periphery. The surrounding chamber 43 at the top part of solenoid 4 is then connected with third chamber C3 through the hollow part of moving iron core 41, linking hole 52 of push rod 5, and hollow part 33 of moving element 3.

Moving valve 6 is configured by adhering a flat annular member 63, which consists of a resilient member made of rubber or another elastomer, to the lower surface of a short cylindrical supporting body 62 and using the lower surface of this annular member 63 as interlocking surface 61 for fixed valve seat 2 and moving valve seat 31. The outer periphery of the top part of supporting body 62 is kept airtight by second shaft seal S2, which is interposed between supporting body and first intermediate body 14, and is slotted with freedom to slide along the inner periphery of first intermediate body 14 in this state, whereby interlocking surface 61 of moving valve 6 is made able to come into contact with and move away from fixed valve seat 2.

The diameter A of the airtight sliding parts of such moving valve 6 (the outer diameter of the part of supporting body 62 that is slotted into first intermediate body 14), effective valve seat diameter D of interlocking surface 61 (the diameter of the part that makes contact with moving valve seat 31), diameter B of the airtight sliding parts of moving element 3 (the outer diameter of the part that is slotted into second intermediate body 15), and effective valve seat diameter C of the fixed valve seat 2 (the diameter of the part that makes contact with moving valve 6) are set roughly similar to each other, whereby the hydropneumatic pressures acting on the upper and lower surfaces of moving valve 6 and moving element 3 are balanced. It is thus possible to prevent the electromagnetic attraction force required to move moving valve 6 and moving element 3 from fluctuating and the control operations from becoming unstable due to imbalance of the abovementioned hydropneumatic pressures.

First spring SP1 consists of a compression spring, and is extended between fixed iron core 42 and supporting body 62 with its top side guided into the gap between push rod 5 and fixed iron core 42 of solenoid 4 and its lower side guided into the gap between push rod 5 and supporting body 62 of moving valve 6. Consequently, when moving element 3 moves downward, its pressing force enables moving valve 6 to move in concert with moving element 3, and finally allows the interlocking surface 61 of moving valve 6 to interlock with fixed valve seat 2.

Second spring SP2 consists of a compression spring, and is extended between moving element 3 and the bottom part of third hole 13 of casing 1 with its top side guided into the lower part of the inner periphery of moving element 3 and its lower side guided into third hole 13. The pressing force of this second spring SP2 is set so as to be larger than the pressing force of first spring SP1, whereby, in the free state when solenoid 4 is not driven, moving valve 6 is kept apart from fixed valve seat 2 by being pushed up by the pressing force of second spring SP2 via moving element 3.

With the abovementioned configuration, by pushing up moving element 3 and push rod 5 with the pressing force of second spring SP2 against the pressing force of the first spring SP1 with such solenoid 4 in the demagnetized state, moving valve seat 31 can be separated from fixed valve seat 2, and moving valve seat 31 can be interlocked with interlocking surface 61 of moving valve 6. Consequently, it is possible to adopt a connecting position in which first chamber C1 and second chamber C2 are connected together, and third chamber C3 is blocked off by moving valve seat 31 and moving valve 6 (see FIG. 2). Here, first port P1 is connected with the hydropneumatic supply side and second port P2 is connected with the actuator side, so that the working pressure can be made to act on the actuator through second port P2.

Here, the working pressure does not act on guide cylinder 46 which guides the sliding of moving iron core 41 of solenoid 4, so that deformation of guide cylinder 46 by the working pressure can be prevented, and it is possible to prevent reduction in the responsivity of solenoid 4 due to increased sliding resistance of moving iron core 41 arising from the deformation of guide cylinder 46. It is also possible to prevent reduction in the longevity of solenoid 4 due to the working pressure being made to act for long periods in the abovementioned demagnetized state. Thus, the abovementioned three-position solenoid valve is particularly suitable for use as a normally-open control valve in a railway vehicle brake device wherein a pneumatic system is used and a large flow rate is required. Moreover, in the abovementioned connecting position, since the working pressure does not act on stopper 44 that closes off surrounding chamber 43 at the top part of solenoid 4, there is no need to increase the strength of stopper 44 by increasing its wall thickness, and solenoid 4 can thus be made correspondingly lighter.

Figure 5:
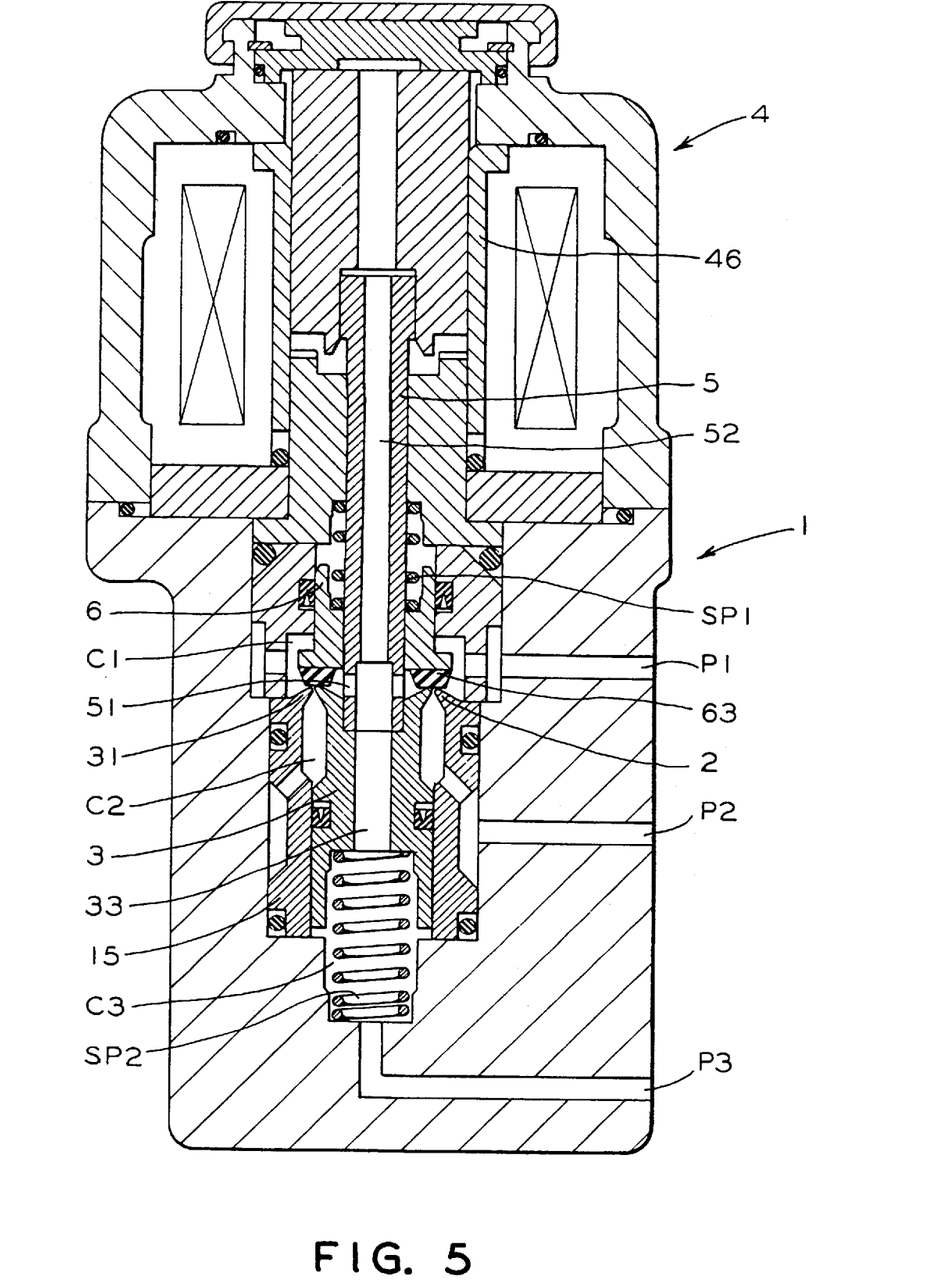
FIG. 5 is an enlarged cross-sectional view of the three-position solenoid valve according to the first aspect of the invention showing the state in which the connecting position is blocked.

On the other hand, if solenoid 4 is driven with a current (first current) that produces an electromagnetic attraction force equivalent to the difference between the pressing force of first spring SP1 and the pressing force of second spring SP2, the electromagnetic attraction force of solenoid 4 can be made to act on moving element 3 via push rod 5. As a result, moving element 3 and moving valve 6 can be moved against the pressing force of second spring SP2 by the combined pressing force of the abovementioned electromagnetic attraction force of solenoid 4 and the pressing force of first spring SP1, thereby interlocking the interlocking surface 61 of moving valve 6 in fixed valve seat 2. Then, simultaneously with this interlocking, the abovementioned pressing force of second spring SP2 and the electromagnetic attraction force of solenoid 4 are balanced, and the movement of moving element 3 is stopped. Here, moving valve seat 31 is kept interlocked with moving valve 6 by the pressing force of second spring SP2. It is thus possible to adopt a blocking position wherein first chamber C1, second chamber C2 and third chamber C3 are all blocked off (See FIG. 5).

Figure 4:
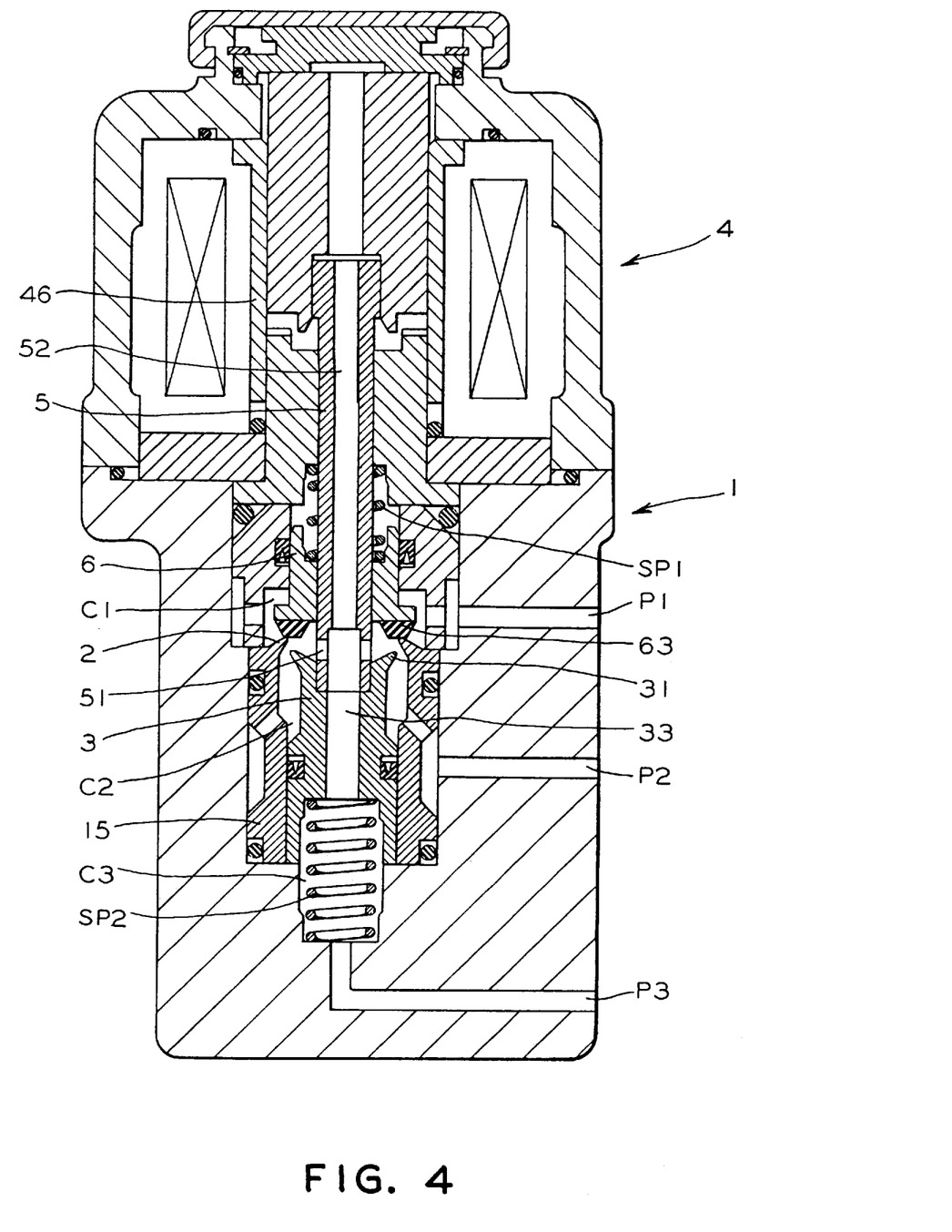
FIG. 4 is an enlarged cross-sectional view of the three-position solenoid valve according to the first aspect of the invention showing the state in which the exhaust position is adopted.

Furthermore, when solenoid 4 is driven, from the state where it is switched into the abovementioned blocking position, for example, with a current (second current) that produces an electromagnetic attraction force that exceeds the pressing force of second spring SP2, it is possible to push moving element 3 further down via push rod 5 with the electromagnetic attraction force of solenoid 4, and it is thereby possible to pull moving valve seat 31 away from interlocking surface 61 of fixed valve 6. As a result, the second chamber C2 can be connected with hollow part 33 of moving element 3 through connecting aperture 51 provided in the vicinity of the bottom end part of push rod 5. It is thus possible to adopt an exhaust position wherein second chamber C2 and third chamber C3 are connected together and first chamber C1 is blocked off (see FIG. 4). Consequently, the air can be exhausted through third port P3 once it has been supplied to the actuator through first port P1.

Figure 6:
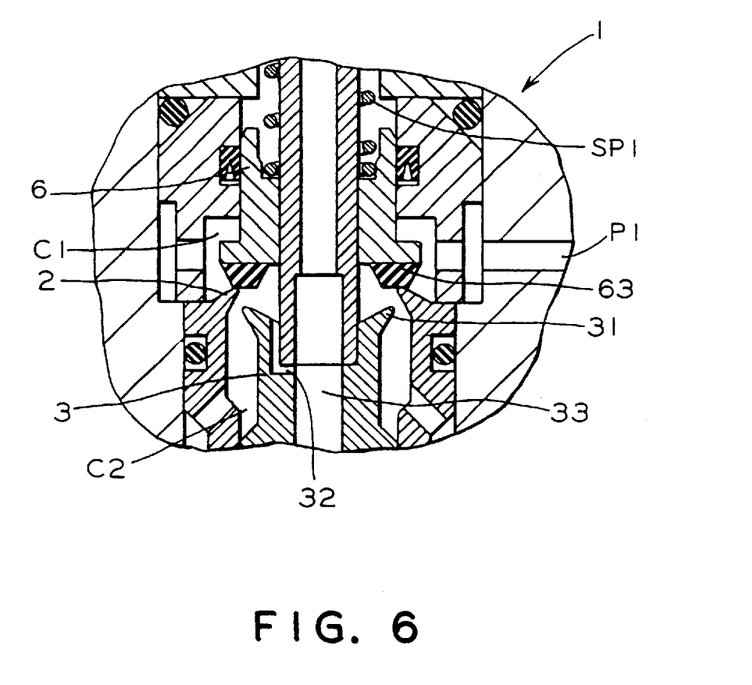
FIG. 6 is an enlarged cross-sectional view of the three-position solenoid valve according to a second aspect of the invention.

Note that in the abovementioned exhaust position, the connecting part that connects second chamber C2 and third chamber C3 need not be configured by a connecting aperture 51 in the vicinity of the bottom end part of push rod 5, as it can also be configured as shown in FIG. 6 by a plurality of connecting channels 32 running from the top end surface of moving element 3 to the inner periphery of moving element 3 along the outer periphery of push rod 5, or by the combination of connecting channels 32 and connecting hole 51.

Figure 7:
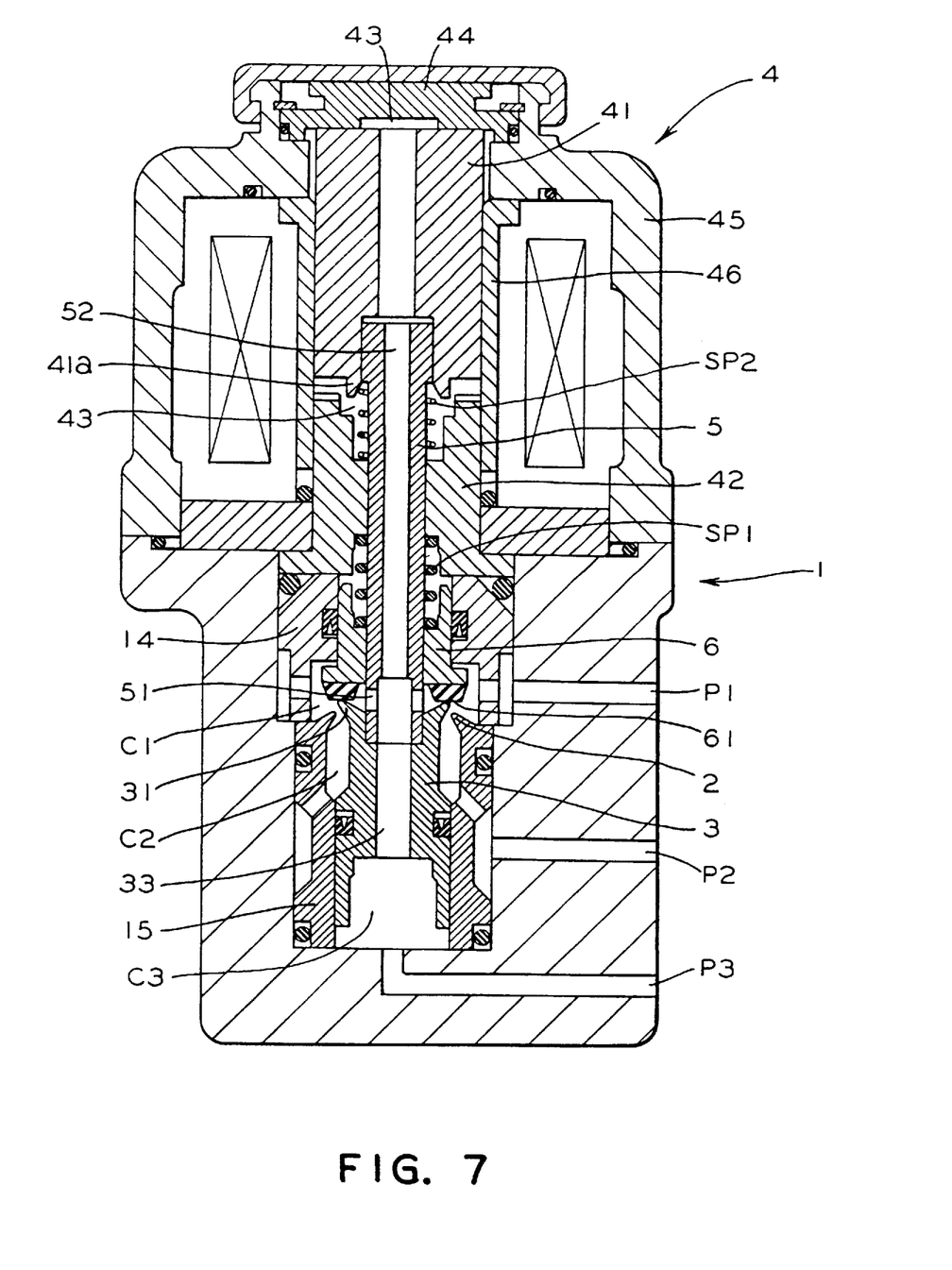
FIG. 7 is a cross-sectional view of the three-position solenoid valve according to a third aspect of the invention.

Furthermore, if push rod 5 and moving element 3 are coupled together, enabling them to move in concert with each other, second spring SP2 can also be provided at the mid part of push rod 5 to provide a compressive force between a flange formed in push rod 5 and a flange formed in fixed iron core 42 (see FIG. 7).

The three-position solenoid valve according to this invention can also be subjected to various other design modifications, such as forming push rod 5 integrally with moving element 3.

As described above, with a three-position solenoid valve according to this invention, since it adopts the connecting position when solenoid 4 is in the nonconducting state, and since the working pressure does not act on guide cylinder 46 that guides the sliding of the moving iron core 41 of solenoid 4 in this connecting position, it is possible to prevent deformation of the guide cylinder 46 by the working pressure, which would reduce the responsivity of the solenoid valve and reduce the longevity of solenoid 4 by having the working pressure acting on it for long periods. Consequently, it is possible to provide a valve that it suitable for use as a normally-open three-position solenoid valve.

It also exhibits a special advantage whereby, when effective valve seat diameter D and diameter A of the airtight sliding parts of moving valve 6, diameter B of the airtight sliding parts of moving element 3, and effective valve seat diameter C of fixed valve seat 2 are roughly similar, the hydropneumatic pressures acting on push rod 5, moving valve 6 and moving element 3 can be respectively balanced at one end and the other end thereof, which makes it possible to prevent variations in the electromagnetic attraction force needed to move the moving valve 6 and moving element 3 and instability of control operations arising from imbalance of the abovementioned hydropneumatic pressures acting thereupon.

With a three-position solenoid valve of the abovementioned configuration, moving element 3 and push rod 5 are pressed by the second spring SP2 in the opposite direction to the pressing force of first spring SP1 while the solenoid 4 is demagnetized, whereby moving valve 6 can be separated from the abovementioned fixed valve seat 2, and moving valve seat 31 can be interlocked with moving valve 6. That is, a connecting state can be adopted wherein first chamber C1 is connected with second chamber C2 and third chamber C3 is blocked off. As a result, the working pressure can be supplied from the primary side to the secondary side, but since third chamber C3 has been blocked off it is possible to prevent guide cylinder 46 that guides the sliding of moving iron core 41 of solenoid 4 from being subjected to the working pressure through linking hole 52 of push rod 5 and the interior of moving element 3.

Next, if the abovementioned solenoid 4 is driven with a current that produces an electromagnetic attraction force corresponding to the difference between the pressing force of first spring SP1 and the pressing force of second spring SP2, moving element 3 can be subjected to the electromagnetic attraction force of solenoid 4 via push rod 5. As a result, the abovementioned moving element 3 and moving valve 6 can be moved against the pressing force of second spring SP2 by the combined pressing force of the electromagnetic attraction force of solenoid 4 and the pressing force of first spring SP1, and in conjunction with this movement moving valve 6 can be interlocked with fixed valve seat 2. Then, simultaneously with this interlocking, the pressing force of second spring SP2 and the electromagnetic attraction force of solenoid 4 balance each other out, and moving element 3 ceases the abovementioned movement while being kept in an interlocked state with moving valve 6. It is thus possible to adopt a blocking position wherein first chamber C1, second chamber C2 and third chamber C3 are all blocked off.

Furthermore, in the abovementioned blocking position, for example, if the abovementioned solenoid 4 is driven with a current that produces an electromagnetic attraction force that exceeds the pressing force of second spring SP2, the abovementioned moving element 3 can be moved by the electromagnetic attraction force of solenoid 4 against the pressing force of second spring SP2 via push rod 5, and it is thereby possible to pull moving valve seat 31 away from the fixed valve. As a result, second chamber C2 can be connected with third chamber C3 through the interior of connecting part 32 and moving element 3. It is thus possible to adopt an exhaust position wherein second chamber C2 and third chamber C3 are connected together and first chamber C1 is blocked off.

Note that in this invention, the concept of the demagnetized state of solenoid 4 is also deemed to include states wherein it is driven with a small current such that the electromagnetic attraction force of solenoid 4 is less than the pressing force of second spring SP2.

In a three-position solenoid valve with the abovementioned configuration, it is preferable that diameter A of the airtight sliding parts and the effective valve seat diameter D of moving valve 6, diameter B of the airtight sliding parts of moving element 3, and effective valve seat diameter C of fixed valve seat 2 are roughly similar, in which case the hydropneumatic pressures acting on moving valve 6 and moving element 3 can be respectively balanced at one end and the other end thereof.

While a presently preferred and a number of alternative embodiments of the present invention have been described in detail above, it should be understood that various other adaptations and/or modifications of the three-position solenoid valve may be envisioned by those persons who are skilled in the relevant art without departing from either the spirit of the invention or the scope of the appended claims.

We claim:

1. A three-position solenoid valve wherein a first chamber that connects with a primary side, a second chamber that connects with a secondary side, and a third chamber that connects with an exhaust side are formed inside a casing, and which can adopt a connecting position wherein said first chamber and said second chamber are connected with each other while said third chamber is blocked off, a blocking position wherein said first chamber, said second chamber and said third chamber are all blocked off, and an exhaust position wherein said first chamber is blocked off and said second chamber and said third chamber are connected with each other, characterized in that it comprises:

(a) a fixed valve seat situated between said first chamber and said second chamber;

(b) a moving valve situated inside said first chamber with freedom to slide while remaining airtight, and which can interlock with said fixed valve seat;

(c) a push rod joined at one end to a moving iron core of such solenoid and at its other end perforates said moving valve through to said second chamber, said push rod defines from said one end thereof through to said other end thereof a linking hole;

(d) a hollow moving element joined to said other end of said push rod and slotted between said second chamber and said third chamber with freedom to slide while remaining airtight;

(e) a moving valve seat provided on said moving element opposite said moving valve, and which can be fed through an inside of said fixed valve seat;

(f) a connecting part formed in any one of (i) said other end of said push rod approximate said moving element and (ii) said hollow moving element, and which, when said solenoid valve is in said exhaust position, connects said second chamber with said third chamber through said hollow of said moving element;

(g) a first spring to press said moving valve toward said fixed valve seat and said moving valve seat; and (h) a second spring to press said moving element and said push rod in an opposite direction to a pressing force of said first spring with a pressing force that is greater than said pressing force of said first spring.

2. The three-position solenoid valve, according to claim 1, wherein airtight sliding portions of said moving valve and said moving element have outer diameters roughly similar to an effective diameter of said moving valve seat and an effective diameter of said fixed valve seat.

3. A three-position solenoid valve wherein a first chamber that connects with a primary side, a second chamber that connects with a secondary side, and a third chamber that connects with an exhaust side are formed inside a casing such that said solenoid valve can adopt (i) a connecting position when deenergized wherein said first chamber and said second chamber are connected with each other while said third chamber is blocked off; (ii) a blocking position when partly energized wherein said first chamber, said second chamber and said third chamber are all blocked off; and (iii) an exhaust position when fully energized wherein said first chamber is blocked off and said second chamber and said third chamber are connected with each other, said valve comprising:

(a) a fixed valve seat situated between said first chamber and said second chamber;

(b) a moving valve for sliding in airtight fashion within said solenoid valve with an interlocking surface thereof disposed in said first chamber so that in said connecting position said interlocking surface is raised away from said fixed valve seat and in both said blocking position and said exhaust position said interlocking surface is seated against said fixed valve seat;

(c) a push rod defining from one end thereof through to its other end thereof a linking hole, and joining at said one end to a moving iron core of said solenoid with said other end perforating said moving valve through to said second chamber;

(d) a hollow moving element joined to said other end of said push rod for sliding in airtight fashion within said solenoid valve with a moving valve seat on a top end thereof situated opposite said interlocking surface of said moving valve and feedable through an inside of said fixed valve seat such that in said exhaust position said moving valve seat is pushed away from said interlocking surface and in both said blocking position and said connecting position said moving valve seat is seated against said interlocking surface;

(e) a connecting part formed in any one of (i) said other end of said push rod approximate said moving element and (ii) said hollow moving element, and which, when said solenoid valve is in said exhaust position, connects said second chamber with said third chamber through said hollow of said moving element;

(f) a first spring for pressing said moving valve with said interlocking surface thereof toward said fixed valve seat and said moving valve seat; and (g) a second spring for pressing said moving element and said push rod in a direction opposite to, and to overcome, a pressing force of said first spring so that said solenoid valve is able to adopt said connecting position when solenoid is deenergized.

4. The three-position solenoid valve, according to claim 3, wherein said second spring is situated compressively against a bottom end of said moving element.

5. The three-position solenoid valve, according to claim 3, wherein said second spring is disposed concentrically about said push rod near said one end thereof and situated compressively between a flange formed in said push rod and a corresponding flange formed in a hollow fixed iron core of said solenoid valve through which a middle of said push rod is slidable.

6. The three-position solenoid valve, according to claim 3, wherein said connecting part is an aperture through a side of said push rod near said other end thereof that communicates with said linking hole inside said push rod.

7. The three-position solenoid valve, according to claim 3, wherein said connecting part is a channel routed from said top end of said moving element to said hollow of said moving element along an outer periphery of said other end of said push rod.

* * * * *